United States Patent [19]

Grabowski

[11] Patent Number: 5,102,436

[45] Date of Patent: Apr. 7, 1992

[54] PREFILTER FOR AN AIR FILTER OF AN INTERNAL COMBUSTION ENGINE

[75] Inventor: Dietmar Grabowski, Stuttgart, Fed. Rep. of Germany

[73] Assignee: Andreas Stihl, Waiblingen, Fed. Rep. of Germany

[21] Appl. No.: 771,053

[22] Filed: Oct. 2, 1991

[30] Foreign Application Priority Data

Oct. 3, 1990 [DE] Fed. Rep. of Germany ....... 4031160

[51] Int. Cl.⁵ ............................................ B01D 46/00
[52] U.S. Cl. ...................................... 55/483; 55/487; 55/496; 55/498; 55/511; 55/521; 55/525; 55/DIG. 31
[58] Field of Search .................. 55/483, 486, 487, 492, 55/493, 495, 496, 497, 498, 511, 521, 525, DIG. 31

[56] References Cited

U.S. PATENT DOCUMENTS

| | | | |
|---|---|---|---|
| 3,408,438 | 10/1968 | Staunton | 55/497 X |
| 3,560,131 | 2/1971 | Yotsumoto | 55/498 X |
| 3,561,604 | 2/1971 | Yotsumoto | 55/498 X |
| 3,621,640 | 11/1971 | Ohno et al. | 55/487 X |
| 3,710,562 | 1/1973 | McKenzie | 55/487 |
| 4,464,260 | 8/1984 | Duneau | 55/496 X |
| 4,969,999 | 11/1990 | Riddell | 55/498 X |

*Primary Examiner*—Charles Hart
*Attorney, Agent, or Firm*—Walter Ottesen

[57] ABSTRACT

A prefilter for an air main filter of an internal combustion engine such as a two-stroke engine is configured as a filter ring with the engine being especially a two-stroke engine in a handheld work tool. The filter ring defines a flow directed essentially radially inward and the prefilter has a band-like configuration and is mounted for covering the outer surface of the main filter. The prefilter includes a screen held in a flexible frame and so permits a rapid exchange thereof and is easy to clean and does not restrict the air throughput. The frame carries a part of the closure device at each end thereof lying in the longitudinal direction.

19 Claims, 3 Drawing Sheets

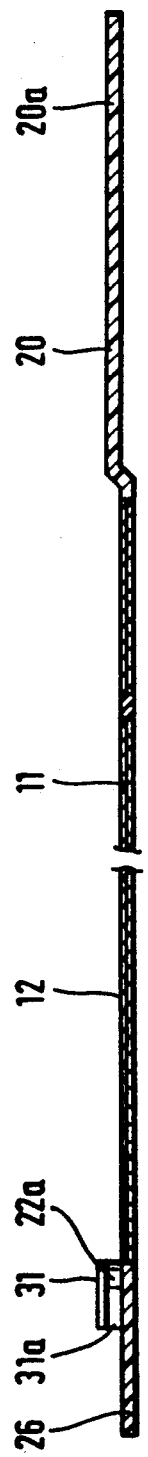
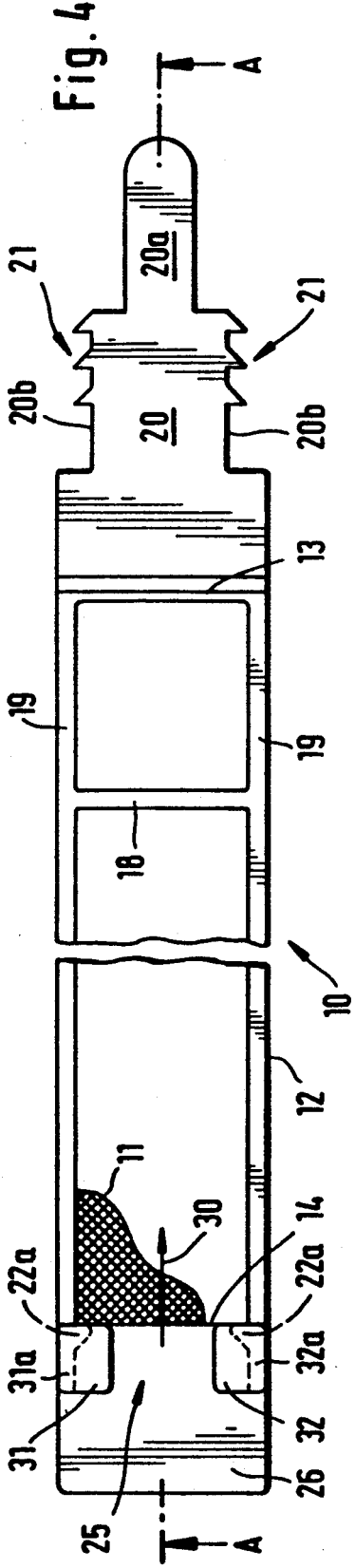
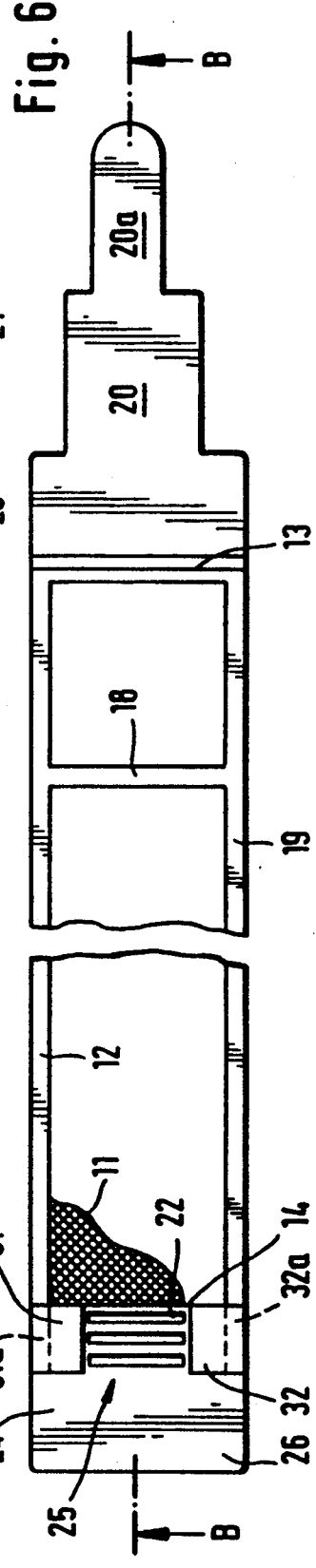

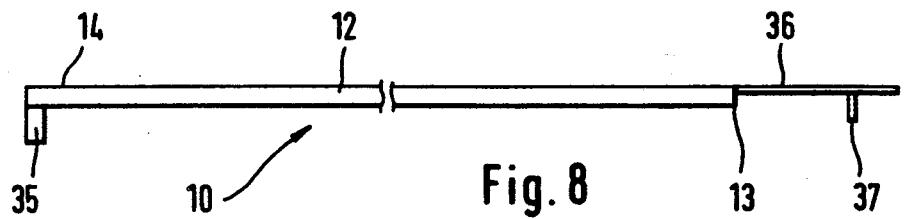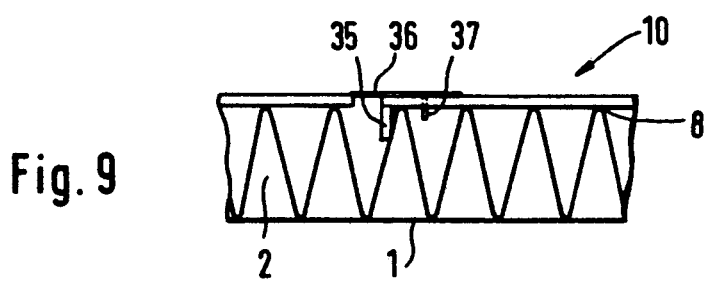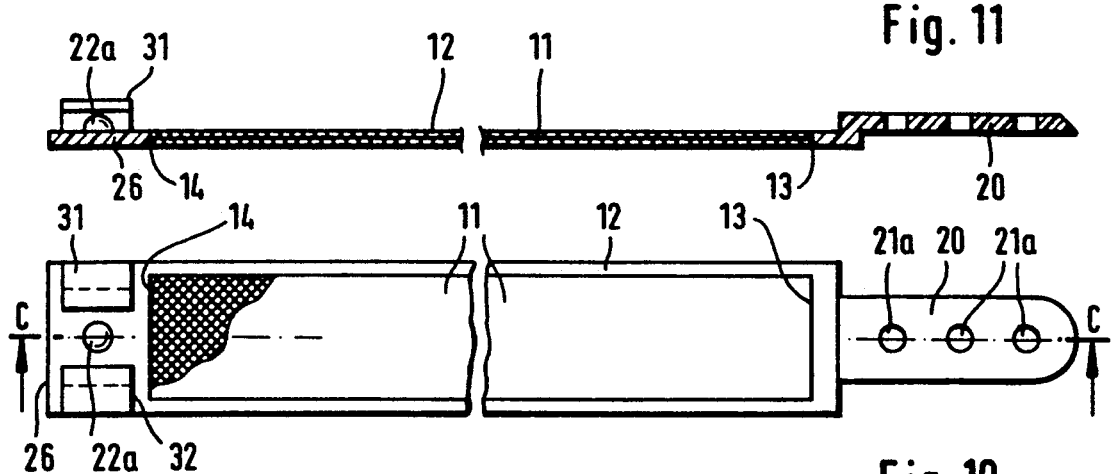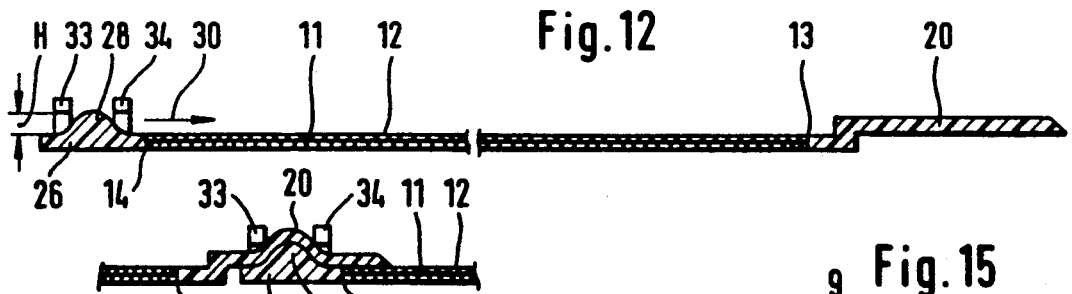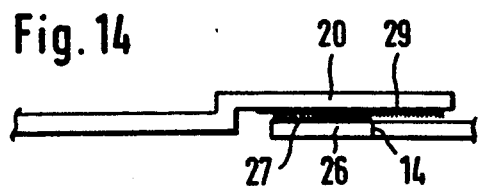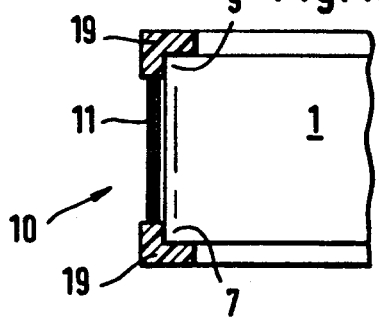

PREFILTER FOR AN AIR FILTER OF AN INTERNAL COMBUSTION ENGINE

FIELD OF THE INVENTION

The invention relates to a prefilter for an air filter of an internal combustion engine such as a two-stroke engine mounted in a handheld portable work tool. The air filter is configured as an annular filter and defines a flow path directed radially toward the interior of the filter.

BACKGROUND OF THE INVENTION

The intake combustion air is burdened to a great extent with coarse dirt particles when using work tools such as motor-driven chain saws, cutoff machines and the like driven by internal combustion engines. These coarse dirt particles can lead to a quick clogging of the main filter. For this reason, a prefilter is used which keeps the coarse dirt particles away from the main filter.

As a prefilter, it is known to use collars made of foam material, felt or the like which cover the outer surface of the main filter and which are intended to keep the coarse dirt particles away from the main filter. However, these prefilters restrict the air throughput and tend to become clogged quickly because of their fine porous configuration. These prefilters must therefore often be cleaned or exchanged.

The prefilter used must furthermore resist also the effects of fuel and heat which affect the firm seating of the prefilter on the filter ring (filter cartridge).

SUMMARY OF THE INVENTION

It is an object of the invention to improve the prefilter of the kind described above so that this prefilter is easy to clean and can be reused often. It is a further object of the invention to provide such an improved prefilter which is seated tightly on the main filter notwithstanding many assemblies and disassemblies.

The prefilter of the invention is for an air main filter of an internal combustion engine and is configured as a filter ring having an outer surface and defining a flow direction substantially radially inward through the outer surface. The prefilter is provided for covering the outer surface of the main filter and includes: a flexible frame and a screen mounted in the frame; the frame and screen conjointly defining a band-like structure; the band-like structure defining a longitudinal axis and the frame having two longitudinal end portions; and, a closure device having first and second parts on corresponding ones of the end portions for coacting to releasably hold the prefilter on the main filter.

The prefilter configured as a screen ensures a reliable filtering of coarse dirt particles and has a reduced tendency of becoming clogged. Since the screen is held in a flexible frame, it is in itself fixed so that the mesh size does not change or so that the screen can unravel. The flexible frame furthermore ensures a fixed and tight seating of the screen on the outer surface of the main filter with the closure device making a precise seating of the band-like prefilter possible and a flush seating on the outer surface of the main filter is ensured even after numerous assemblies and disassemblies. The screen is reusable many times because the screen is easily cleaned of coarse dirt particles.

In a preferred embodiment of the invention, the frame is made of plastic and is configured as a single piece with the closure device which is preferably molded onto the screen.

The closure device is configured in the manner of a belt buckle with the parts of the closure device interengaging in a form-tight or friction-tight manner.

BRIEF DESCRIPTION OF THE DRAWINGS

The invention will now be described with reference to the drawings wherein:

FIG. 4 is a plan view of the prefilter of FIG. 2 laid out flat;

FIG. 5 is a section view along line A—A of FIG. 4;

FIG. 6 is a plan view according to another embodiment of the prefilter with the latter also laid out flat;

FIG. 7 is a section view taken along line B—B of FIG. 6;

FIG. 8 is a view of a prefilter according to a further embodiment of the invention;

FIG. 9 is a broken-out portion of the main filter with the prefilter of FIG. 8 mounted thereon;

FIG. 10 is a plan view of a prefilter according to a further embodiment with the prefilter laid out flat;

FIG. 11 is a section view taken along line C—C of FIG. 10;

FIG. 12 is a section view taken through a further embodiment of a prefilter of the invention;

FIG. 13 is a section view taken through the closure device of the prefilter of FIG. 12;

FIG. 14 is a schematic of a closure device configured as a VELCRO closure; and,

FIG. 15 is a section view taken through the frame of the prefilter.

DESCRIPTION OF THE PREFERRED EMBODIMENTS OF THE INVENTION

Figure 1:
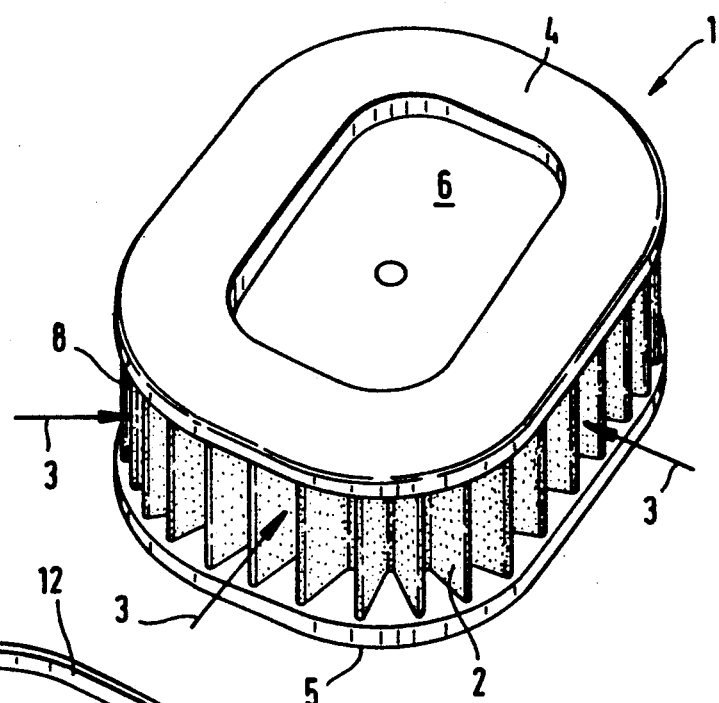
FIG. 1 is a perspective view of a main filter configured as an annular filter.

The main filter 1 shown in FIG. 1 comprises a filter ring 2 configured from a filter band folded in a zigzag manner. The filter ring 2 includes an upper annular end plate 4 and a lower annular end plate 5 which axially delimit the filter ring 2 and are connected with the latter to form a component. The upper end plate 4 has a central closure plate 6 which is preferably configured as a single piece with the end plate 4 and axially delimits the central clean chamber of the filter ring 2 at one end.

The main filter 1 defines a flow direction 3 directed essentially radially toward the inside so that the air to be cleaned passes through the outer surface 8 of the main filter 1 and flows radially through the filter ring 2 and enters the central clean chamber filtered. The air flows from the central chamber axially through a central opening of the lower end plate 5.

Figure 2:
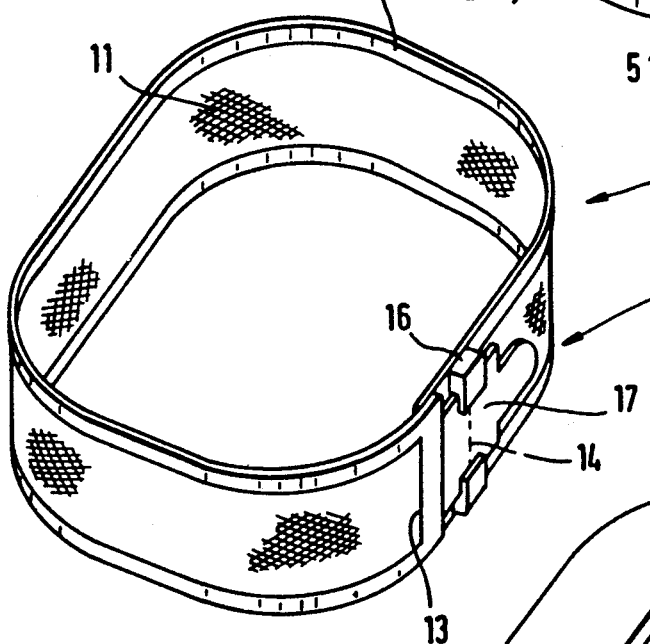
FIG. 2 is a perspective view of a closed prefilter.

A prefilter 10 is mounted on the outer surface 8 of the main filter 1 and essentially comprises a band-like screen 11 held in a frame 12. The frame 12 has parts 16 and 17 of a closure device 15 at its ends 14 and 13, respectively. The band-like frame 12 is essentially rectangular and can be closed to define a ring as shown in FIG. 2 with the parts 16 and 17 of the closure device 15. The ring is adjustable in its diameter by inserting the closure pieces 16 and 17 of the closure device 15 into each other so that the ring is tightly mounted on the outer surface 8 of the main filter 1 in such a manner that it cannot separate therefrom.

Figure 3:
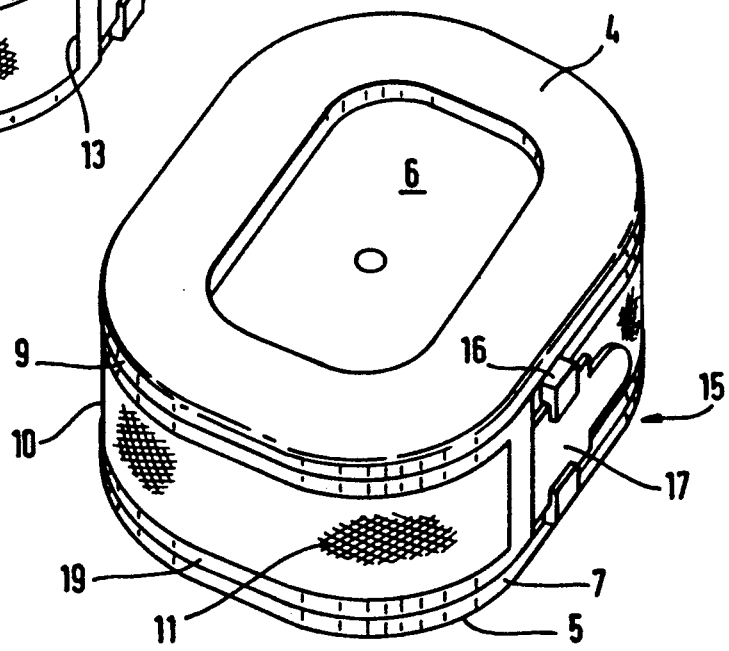
FIG. 3 is a perspective view of the prefilter mounted on the main filter.

In FIG. 3, the prefilter 10 is shown mounted on the main filter 1. In this embodiment, the frame 12 is disposed substantially without play between the peripheral edges 6 and 7 of the end plates 4 and 5. The mounting is here advantageously made so that the peripheral edges 9 and 7 and the frame 12 lie in one plane so that the prefilter 10 does not project beyond the outer boundary edges of the main filter.

The frame 12 of the prefilter is made out of a flexible material and preferably, the frame is made of plastic and is injection molded onto the screen defining the prefilter. The screen has a mesh size of approximately $1 \times 1$ mm and is manufactured of wire, preferably plastic wire. The parts 16 and 17 of the closure device 15 are especially configured as one piece with the frame. Overall, the closure device 15 is provided in the form of a belt buckle with the parts for closing the prefilter band being insertable one into the other in the longitudinal direction of the frame.

Possible embodiments of the closure device 15 are shown in FIGS. 4 to 14. The one end 13 of the frame 12 is provided with an insert tongue 20 which advantageously has a pilot insert 20a at the forward end thereof. The pilot insert 20a has a width less than the width of the insert tongue 20 whereby a simple introduction of the insert tongue 20 into the insert opening 25 at the other end 14 of the frame is obtained. The insert opening is bounded by two angle sections (31, 32) which are mounted to a base plate 26 at the elevation of the frame edge 19 and overlap the insert tongue 20 at its lateral edges. It can be advantageous to connect the two angle sections (31, 32) to define a bridge-like bracket.

The leg 31a of the angle section 31 lies perpendicular to the base plate 26 as does the leg 32a of the angle section 32. The legs (31a, 32a) have respective latch cams 22a which face each other and project laterally into the insert opening 25.

The insert tongue 20 has a set of latch teeth 21 on respective lateral edges 20b and the latch cams 22a disposed in the insert opening 25 engage corresponding ones of the latch teeth sets 21 so that the insert tongue is held in a form-tight manner in the insert opening 25 in a direction opposite to the insert direction 30. The insert tongue 20 is inserted in the direction of arrow 30 until the prefilter is seated tightly on the outer surface 8 of the main filter and so that it cannot separate therefrom.

In the embodiment of FIGS. 4 and 5, the latch teeth sets 21 and the latch cams 22a lie in a plane together with the insert tongue 20. In the embodiment of FIGS. 6 and 7, the latch teeth set 21 of the insert tongue 20 is arranged on the surface 23 of the insert tongue which faces the base plate 26 when in the inserted position. The surface 24 of the base plate 26 lies opposite the surface 23 of the insert tongue 20 and has a latch teeth set 22 which preferably lies in the region between the angle sections 31 and 32 which is shown open in the plan view.

The prefilter of FIGS. 6 and 7 is configured in a manner corresponding to the prefilter according to FIGS. 4 and 5 so that the same parts are identified by the same reference numerals.

In FIGS. 4 and 6, a reinforcement rib 18 is provided between the two frame edges 19 with the rib 18 connecting the frame edges 19 to each other. Several such reinforcement ribs can be provided over the length of the prefilter 11 and are preferably at the same spacing with each other. Only one reinforcement rib 18 is shown in the embodiments of FIGS. 4 and 6.

A further embodiment of the closure device is shown in FIGS. 10 and 11 with this embodiment being similar to the one shown in FIGS. 6 and 7. Latch openings 21a are provided in lieu of latch teeth in the insert tongue 20. The latch openings 21a are arranged one behind the other in the longitudinal direction of the insert tongue 20 and are spaced at the same distance one from the other. On the base plate 26, a latch cam 22a is provided to coact with the latch openings 21a with the latch cam 22a being arranged perpendicular on the base plate 26. The latch cam 22a lies between the angle sections 31 and 32 on the longitudinal center axis of the frame 12.

In the embodiment of FIGS. 12 and 13, a protrusion 28, which extends transversely to the insert direction 30, is arranged on the plate 26. The insert opening is, in turn, defined by two pairs of angle sections 33 and 34 of which one from each pair is shown mounted side by side on one edge of the frame when viewed in the direction 30. The first pair of angle sections 33 is provided in the insert direction 30 ahead of the protrusion 28; whereas, the second pair 34 is arranged after the protrusion 28 viewed in the insert direction 30. The elevation of the protrusion 28 is equal to or preferably slightly greater than the clear elevation H of the insert opening defined by the first pair of angle sections 33 and the second pair of angle sections 34.

As shown in FIG. 13, the insert tongue 20 is deformed elastically when inserted with the insert tongue 20 being held by the angle section pairs 33 and 34 at the lateral edges of the insert tongue 20 forward of and rearward of the protrusion 28. The insert tongue 20 then lies in a friction fit above the protrusion 28 so that this protrusion is held friction tight opposite to the insert direction 30.

The closure device is shown configured as a VELCRO closure in FIG. 14 and is a simplified embodiment of the closure device. The part 27 of the VELCRO closure is fixedly attached to the base plate 26 at one end 14 of the frame; whereas, the other part 29 of the VELCRO closure is mounted on the surface of the insert tongue 20 facing toward the base plate 26. The function of the VELCRO closure is known so that no further description is provided here.

In another embodiment of the closure device and referring to FIGS. 8 and 9, the frame 12 has a holding pin, hook or the like at its end 14 which is arranged approximately at the elevation of the longitudinal center line of the frame 12 and is disposed perpendicular to the plane of the frame. A further holding pin 37, hook or the like is provided at the other end of the frame 12 and likewise lies approximately on the longitudinal center line of the frame 12 perpendicular to the plane of the frame. The holding pin 37 is attached to a connecting section which is connected to the end 13. The connecting section 36 can be a spring or, as shown in the embodiment, a rubber band or the like.

As shown in FIG. 9, the prefilter 10 is fixed on the main filter 1 with pins facing toward the filter ring 2. The holding pin 35 engages between the folds of the filter ring 2 so that the one end 14 of the frame 12 is fixed in the peripheral direction of the filter ring 2. The frame 12 is placed in the peripheral direction around the filter ring 2 and the holding pin 13 is hooked into the screen 11 held by the frame 12 while stretching the connecting section 36. With the stretching of the connecting section, a force acts on the prefilter 10 in the peripheral direction of the filter ring 2 which tends to move the end 13 toward the end 14 of the frame 12. In this way, the frame 12 is held tightly on the outer surface 8 of the main filter 1.

In a further embodiment of the invention, the frame edges 19 are configured as angle profiles as shown in FIG. 15. The angle profiles engage over the peripheral edges 7 and 9 of the main filter so that the prefilter 10 is held so that it cannot separate from the main filter 1. Since the frame preferably comprises an elastic material, a tight seating of the frame edges 19 on the peripheral edges 7 and 9 is obtained so that no unwanted air can penetrate between the prefilter 10 and the main filter 1.

It can be advantageous to provide the prefilter with fixing claws, angles or the like for fixing the same to the filter ring. The fixing claws, angles or the like are spaced from each other and can be molded or otherwise applied to the prefilter. Furthermore, projections or burls can be provided on the plastic frame of the prefilter for fixing the prefilter against slipping from the filter cartridge. The projections or burls engage in the ribs of the filter ring and so hold the prefilter axially with precision.

It is understood that the foregoing description is that of the preferred embodiments of the invention and that various changes and modifications may be made thereto without departing from the spirit and scope of the invention as defined in the appended claims.

What is claimed is:

1. A prefilter for an air main filter of an internal combustion engine, the main filter being configured as a filter ring having an outer surface and defining a flow direction substantially radially inward through the outer surface, the prefilter being provided for covering the outer surface of the main filter and comprising:

a flexible frame and a screen mounted in said frame; said frame and screen conjointly defining a band-like structure;

said band-like structure defining a longitudinal axis and said frame having two longitudinal end portions; and, a closure device having first and second parts on corresponding ones of said end portions for coacting to releasably hold said prefilter on the main filter.

2. The prefilter of claim 1, said frame being made of plastic and being molded onto said screen.

3. The prefilter of claim 2, said screen being made of wire and having a mesh size of approximately 1×1 mm.

4. The prefilter of claim 3, said wire being made of plastic.

5. The prefilter of claim 1, said parts of said closure device each being formed as a single piece with said frame.

6. The prefilter of claim 1, wherein the main filter has upper and lower peripheral edges and said frame is dimensioned to fit precisely between said peripheral edges.

7. The prefilter of claim 1, wherein the main filter has upper and lower peripheral edges; and, said frame having lateral edges formed on respective longitudinal sides thereof to radially engage over said peripheral edges, respectively.

8. The prefilter of claim 1, said frame having at least one reinforcement rib extending transversely to said longitudinal axis.

9. The prefilter of claim 1, said first part including an insert tongue; said second part defining an insert opening for receiving said insert tongue therein; and, said insert tongue including a narrow pilot section extending from said insert tongue to facilitate insertion of said insert tongue into said insert opening.

10. The prefilter of claim 1, said first part including an insert tongue; said second part defining an insert opening for receiving said insert tongue therein; and, said first and second parts conjointly defining locking interface means for holding said insert tongue in said insert opening in a form-tight manner.

11. The prefilter of claim 10, said locking interface means including a first set of latch teeth formed on said first part and a second set of latch teeth formed on said second part for interdigitally engaging the teeth of said first set of latch teeth when said first part is inserted into said second part.

12. The prefilter of claim 11, said first and second sets of latch teeth and said insert tongue conjointly defining a common plane.

13. The prefilter of claim 11, said second part including a base plate defining an upper surface and bracket means formed on said base plate to extend above said upper surface to define said insert opening therewith; and, said insert tongue of said first part having a lower surface facing said upper surface of said second part when said insert tongue is inserted into said insert opening; and said first and second sets of latch teeth being formed on lower and upper surfaces, respectively.

14. The prefilter of claim 10, said second part including a base plate defining an upper surface and bracket means formed on said base plate to extend above said upper surface to define said insert opening therewith; and, said insert tongue of said first part having a lower surface facing said upper surface of said second part when said insert tongue is inserted into said insert opening; said locking interface means including a plurality of latch openings formed in said base plate and arranged in a row one behind the other; and, a plurality of latch cams formed on said upper surface to engage selected ones of said latch openings when said insert tongue is inserted into said insert opening.

15. The prefilter of claim 1, said first part including an insert tongue; said second part defining an insert opening for receiving said insert tongue therein; and, said first and second parts conjointly defining friction means formed thereon for holding said insert tongue in said insert opening in a friction-tight manner.

16. The prefilter of claim 15, said second part including: a base plate defining an upper surface and peripheral edges on respective sides of said longitudinal axis; two first angle sections formed on one of said peripheral edges so as to define a space therebetween and two second angle sections formed on the other one of said peripheral edges so as to also define a space therebetween and so as to be directly adjacent respective ones of said first angle sections; said angle sections defining said insert opening and being configured to engage over said insert tongue when said insert tongue is inserted in said insert opening; said second part further including a protrusion formed on said upper surface in the space between the first angle sections and between said second angle sections; and, said protrusion extending transversely to said longitudinal axis and having an elevation (H) corresponding approximately to the elevation of said angle sections.

17. The prefilter of claim 1, said closure device being a VELCRO closure.

18. The prefilter of claim 1, wherein the main filter includes a ring filter; and, said first part being disposed on one of said end portions and including a first holding pin extending into the ring filter; and, said second part including: a second holding pin engaging said screen; and, a resilient connecting piece for connecting said second holding pin to the other one of said end portions of said frame.

19. The prefilter of claim 18, said connecting piece being a spring.